(No Model.)
C. CALLAHAN.
HOSE.
No. 278,312.  Patented May 29, 1883.
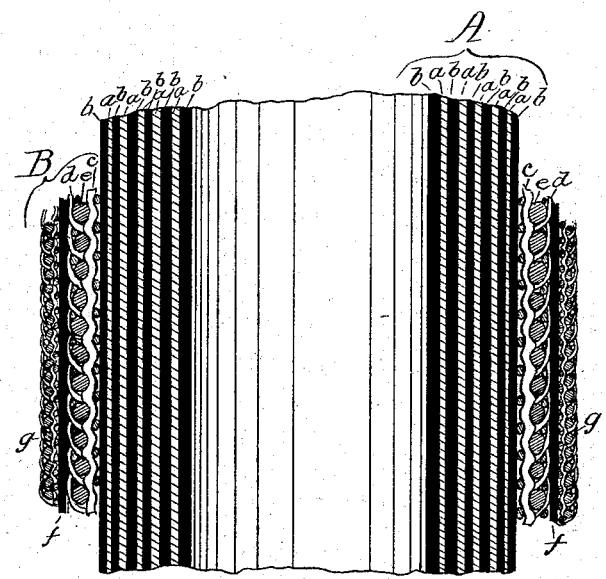
Witnesses.
Fred A. Powell
A. O. Orne
Inventor.
Cornelius Callahan
by Crosby & Gregory
Attys.

UNITED STATES PATENT OFFICE.

CORNELIUS CALLAHAN, OF CHELSEA, MASSACHUSETTS, ASSIGNOR TO THE AMERICAN FIRE HOSE MANUFACTURING COMPANY, OF SAME PLACE.

HOSE.

SPECIFICATION forming part of Letters Patent No. 278,312, dated May 29, 1883.

Application filed May 11, 1881. (No model.)

*To all whom it may concern:*

Be it known that I, CORNELIUS CALLAHAN, of Chelsea, county of Suffolk, and State of Massachusetts, have invented an Improvement in Hose, of which the following description, in connection with the accompanying drawing, is a specification.

This invention relates to suction-hose, and has for its object the production of a cheap and serviceable hose which will not collapse.

A patent heretofore granted to me, No. 222,770, shows a suction-hose provided with a helical metallic weft. In that patent the india-rubber tube was placed outside the wire-stiffened woven tube. I have discovered that I may produce a very serviceable hose by using the wire-stiffened woven tube as a covering for a multi-ply rubber and cloth hose, and it is in such a hose as will be hereinafter described that this my present invention consists.

A multi-ply india-rubber hose is now commonly made by winding layers of cloth and india-rubber upon a mandrel. This hose is not, however, suitable by itself for a suction-hose, but may be made to answer for such purpose provided it is incased externally by a metal-strengthened tube, so that it cannot assume other than circular form externally on the formation of a vacuum in the india-rubber tube.

The drawing shows a piece of my improved suction-hose in longitudinal section.

In the drawing, A represents a piece of multi-ply vulcanized india-rubber hose composed of layers of cloth $a$ and india-rubber $b$.

The tube B is composed of threads $c\ d$ and a stiff helical wire weft, $e$, knitted together, substantially as in my Patent No. 222,770, referred to, to which reference may be had.

In this my invention the multi-ply hose A, which I now employ as the interior of the hose, will be composed of two or more layers each of cloth and india-rubber, the thickness being such in proportion to its diameter that suction within the hose will not permit it to collapse without a part of the exterior of the hose is moved outward beyond the usual peripheral line thereof when the hose is not subjected to suction. To prevent the possibility of such outward movement of the periphery of the multi-ply hose, I apply outside of it the wire-strengthened tube B, the latter being drawn over the multi-ply hose A.

In order to preserve the integrity of the tube B, it is necessary to protect externally the fibrous threads which inclose the wire weft. This I shall do by means of a tubular fabric, $g$, preferably a knitted fabric, and between the said tubular fabric and the tube B, I may, if desired, add a layer, $f$, of india-rubber.

I am aware that a thin tube of india-rubber has been drawn within a woven tube and been vulcanized and joined to the interior of the woven tube; but such a thin lining, if employed in a suction-hose, would be quickly detached.

I claim—

As an improved article of manufacture, a suction-hose composed of a multi-ply india-rubber and cloth tube, A, and inclosing knitted tube B, having a helically-arranged wire weft interlocked by textile threads $c\ d$, and external fibrous tube, $g$, all arranged to operate substantially as and for the purpose described.

In testimony whereof I have signed my name to this specification in the presence of two subscribing witnesses.

CORNELIUS CALLAHAN.

Witnesses:
G. W. GREGORY,
L. F. CONNOR.